(12) United States Patent
Abel et al.

(10) Patent No.: US 9,446,665 B2
(45) Date of Patent: Sep. 20, 2016

(54) DISPLAY AND OPERATING SYSTEM FOR A MOTOR VEHICLE

(75) Inventors: Heinz-Bernhard Abel, Großostheim-Pflaumheim (DE); Günter Urlaub, Schaafheim (DE)

(73) Assignee: Continental Automotive GmbH, Hannover (DE)

( * ) Notice: Subject to any disclaimer, the term of this patent is extended or adjusted under 35 U.S.C. 154(b) by 7 days.

(21) Appl. No.: 14/343,326

(22) PCT Filed: Sep. 4, 2012

(86) PCT No.: PCT/EP2012/067166
§ 371 (c)(1),
(2), (4) Date: Mar. 6, 2014

(87) PCT Pub. No.: WO2013/034531
PCT Pub. Date: Mar. 14, 2013

(65) Prior Publication Data
US 2014/0210605 A1    Jul. 31, 2014

(30) Foreign Application Priority Data
Sep. 9, 2011    (DE) .................. 10 2011 082 467

(51) Int. Cl.
*B60Q 1/00* (2006.01)
*B60K 37/02* (2006.01)
*G06F 3/0486* (2013.01)
*G06F 3/0488* (2013.01)

(52) U.S. Cl.
CPC ............ *B60K 37/02* (2013.01); *G06F 3/0486* (2013.01); *G06F 3/04883* (2013.01); B60K 2350/1028 (2013.01); B60K 2350/203 (2013.01); B60K 2350/2082 (2013.01); B60K 2350/908 (2013.01)

(58) Field of Classification Search
CPC ...................................... B60K 37/02
USPC .............. 340/438, 441, 461, 425.5
See application file for complete search history.

(56) References Cited

U.S. PATENT DOCUMENTS

| 4,455,774 A * | 6/1984 | Watanabe ............ 40/451 |
| 7,683,771 B1 | 3/2010 | Loeb |
| 2004/0240777 A1* | 12/2004 | Woodgate et al. ....... 385/16 |
| 2009/0066532 A1* | 3/2009 | Kraus ............... 340/691.4 |
| 2010/0127847 A1 | 5/2010 | Evans |
| 2011/0006892 A1 | 1/2011 | Karpinsky |

FOREIGN PATENT DOCUMENTS

| DE | 82 22 120 | 8/1983 |
| DE | 201 03 004 | 8/2001 |
| DE | 100 24 232 | 11/2001 |
| DE | 10 2005 049 127 | 4/2007 |

(Continued)

*Primary Examiner* — Brent Swarthout
(74) *Attorney, Agent, or Firm* — Cozen O'Connor

(57) ABSTRACT

A display and operator control system for a motor vehicle includes: an instrument cluster configured to display operating parameters of the motor vehicle, the instrument cluster having a plurality of displays adhesively bonded under a common covering pane, the plurality of displays including: (i) a first display configured to display the speed of the motor vehicle, and (ii) a second display embodied as a touchscreen for representing and activating operator control functions; and an operator control system configured to control devices of the motor vehicle.

11 Claims, 3 Drawing Sheets

(56) References Cited

FOREIGN PATENT DOCUMENTS

| DE | 10 2009 038 044 | 2/2011 |
| WO | WO 2004/021464 | 3/2004 |
| WO | WO 2010/042101 | 4/2010 |

* cited by examiner

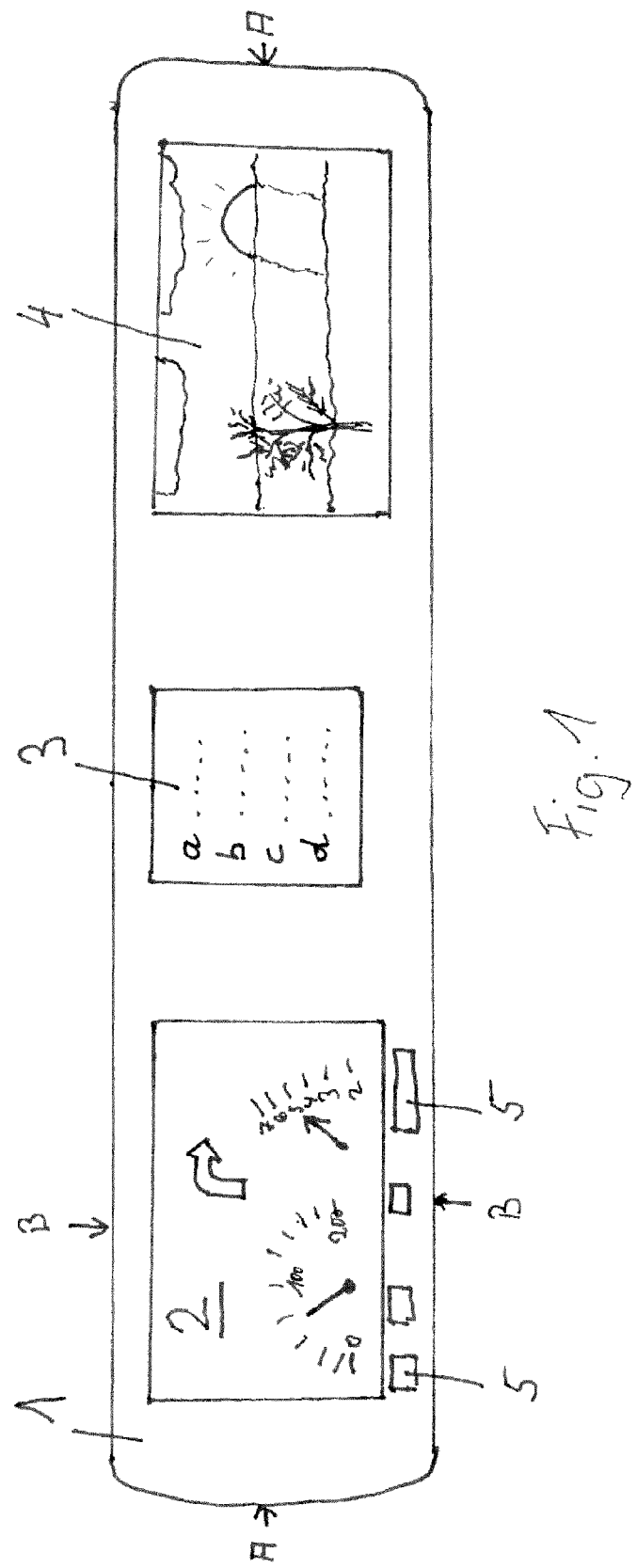

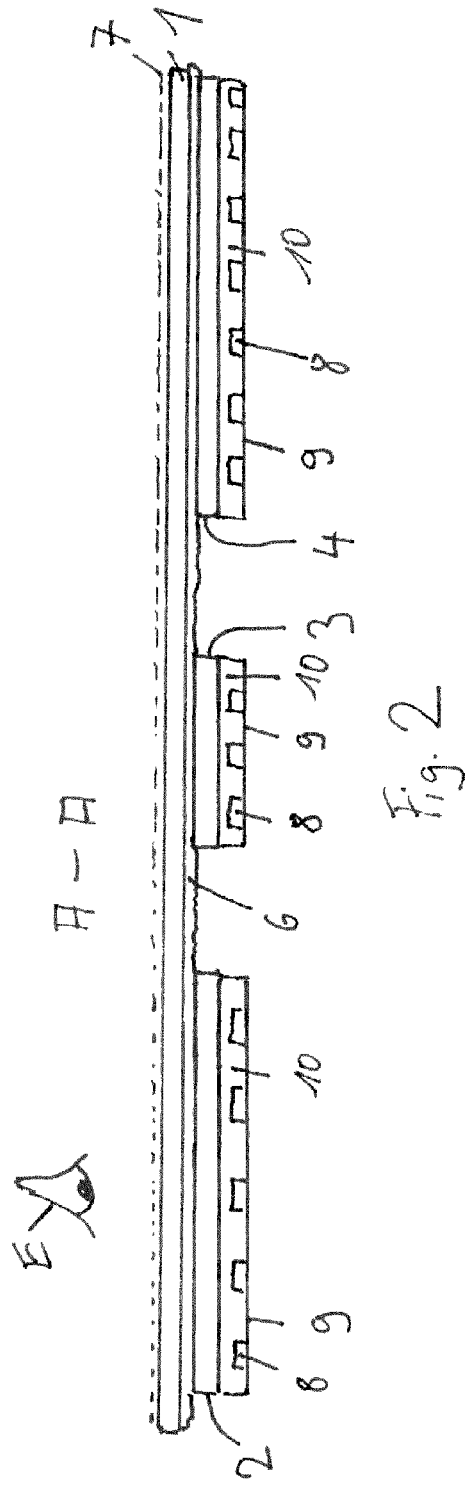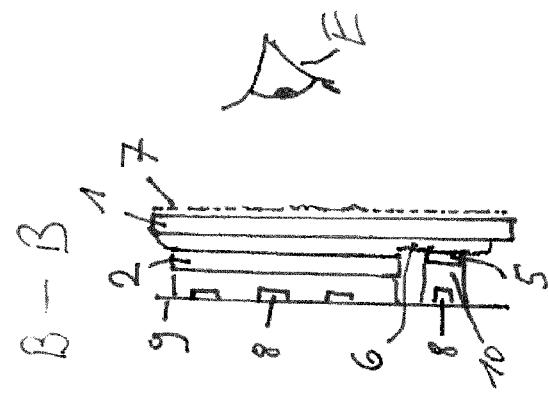

DISPLAY AND OPERATING SYSTEM FOR A MOTOR VEHICLE

CROSS REFERENCE TO RELATED APPLICATIONS

This is a U.S. national stage of application No. PCT/EP2012/067166, filed on Sep. 4, 2012. Priority is claimed on German Application No.: DE102011082467.7 filed Sep. 9, 2011; the content of which is incorporated herein by reference.

BACKGROUND OF THE INVENTION

1. Field of the Invention

The invention relates to a display and operator control system for a motor vehicle, having a combination instrument, also known as an instrument cluster, for displaying the speed and further operating parameters of the motor vehicle and an operator control system for controlling various devices of the motor vehicle.

2. Related Art

From the prior art it is known that in motor vehicles a combination instrument is mounted in the area behind the steering wheel considered from the point of view of a driver and that an operator control system for controlling various devices of the motor vehicle, for example a car radio, a navigation system or an air conditioning system, is arranged laterally next to the seat or obliquely in front of the seat of the driver. The combination instrument and the operator control system are installed as respectively separate devices in a cockpit. It is disadvantageous here that the devices can be perceived to differing degrees owing to their different design.

SUMMARY OF THE INVENTION

An object of the invention is therefore to specify a previously known display and operator control system for a motor vehicle which has a uniform appearance and perceptibility. In one aspect, this object is achieved in that a plurality of displays are adhesively bonded under a common covering pane, a first display is designed to display the speed of the motor vehicle, and a second display is embodied as a touchscreen, for representing and activating operator control functions. This ensures that uniform perceptibility is achieved through the uniform surface. These displays are configured as electro-optical displays, for example as liquid crystal displays or OLED displays.

In one aspect of the present invention, a particularly visually attractive appearance is achieved if the displays are bonded visually to the common covering pane. In the case of displays that are adhered by this method it is ensured that no air bubbles are occluded between the covering pane and the respective display, with the result that good legibility of the display is ensured and a valuable impression is produced. If the common covering pane is colored, a particularly uniform impression is produced. Given sufficient coloring it is ensured that a junction between the individual displays can no longer be perceived and the display and operator control system can be perceived as a single display since the junction cannot be perceived in the intermediate spaces between the individual displays.

In another aspect, if a third display is present, preferably located in the area in front of the front passenger's seat, miscellaneous information or entertainment contents can be represented separately to the front seat passenger. If the third display is also embodied as a touchscreen, a front seat passenger can also perform operator control processes separately.

In another aspect, if the image contents of the displays can be reconfigured, the desired information, and even the method of representation of the information, is assigned to the individual displays. It is then also possible, for example, to change the position of the image contents by pulling with one or more fingers and to change the size of said contents, and to shift the image contents between the individual displays.

In another aspect, the common covering pane is provided with an anti-reflection layer, which improves the perceptibility of the individual, represented information even under changing light conditions. This anti-reflection layer can be provided, for example, by an anti-reflection film adhered onto the common covering pane or an anti-reflection surface coating applied to the common covering pane.

In another aspect, warning and/or indicator lights are arranged separately underneath the common covering pane. This achieves at least two advantages: firstly, the space for these warning and indicator lights on the first display is freed up, and secondly the driver is not confused by the permanently predefined position of the individual warning and/or indicator lights since he can become accustomed to where the individual warning and/or indicator information appears. In one aspect, the separate warning and/or indicator lights can be composed, for example, of a printed film that can be illuminated from its rear in order to output the corresponding warning or the corresponding indication. If one or more of the touchscreens have haptic feedback, the execution of the desired operator control function can be fed back to a driver. The touchscreens can be implemented, for example, in a capacitive, resistive or visual fashion. A capacitive solution is preferred since it can be implemented easily and the visual properties of the displays are adversely affected the least.

In another aspect, the edge of the common covering pane is configured as a decorative element, improving the visual appearance further. This decorative element may be configured, for example, from a metallic or metalized edge or as a light ring which bounds the contour of the common covering pane. It is also possible to dispense completely with a decorative element since the common covering pane can have a clean homogenous edge, and therefore a particular boundary is not necessary.

BRIEF DESCRIPTION OF THE DRAWINGS

The invention will be described in more detail below with reference to the figures, in which:

FIG. 1 shows a plan view of a preferred display and operator control system;
FIG. 2 shows the section A-A from FIG. 1;
FIG. 3 shows the section B-B from FIG. 1.

DETAILED DESCRIPTION OF THE PRESENTLY PREFERRED EMBODIMENTS

Figure 4:
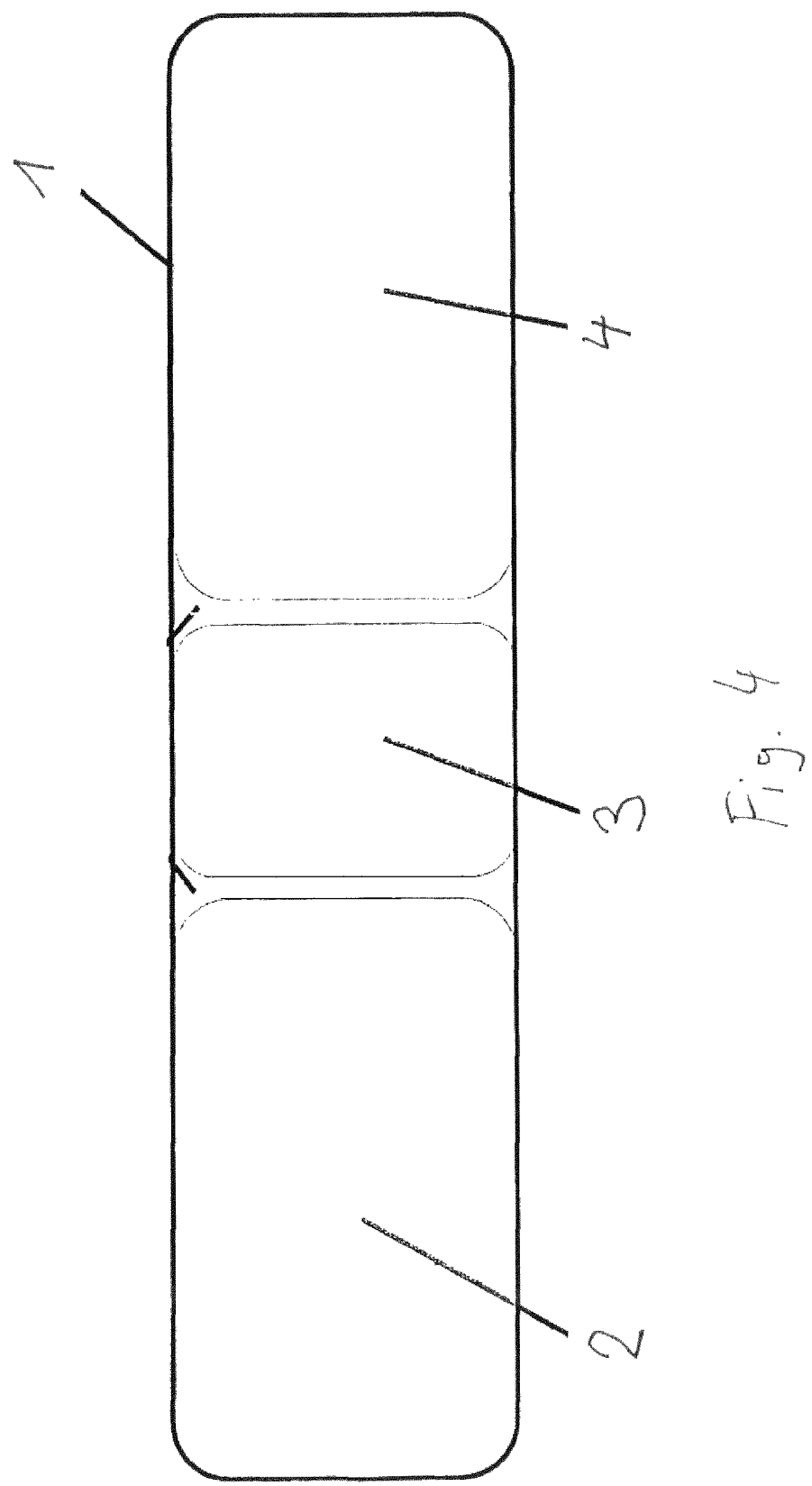
FIG. 4 shows a plan view of a further preferred exemplary embodiment.

FIG. 1 shows a common covering pane 1, a first display 2, a second display 3, a third display 4 and warning lights 5. In a real situation, the corresponding displays and warning lights would be perceived underneath the covering pane 1 only when they are illuminated, since the common covering pane 1 is correspondingly colored. Depending on the configuration request, the displays 2-4 can be configured such that the represented edges can be perceived, for example through a specially printed edge. However, it is particularly preferred to configure the displays 2-4 in such a way that their edges cannot be perceived even in the switched-on state. A speedometer and a rev counter and a direction arrow of a navigation system are represented on the first display 2, an operator control menu function is represented on the second display 3, and entertainment information is represented on the third display 4. The image contents of the second display 3 change depending on the function set, which function is brought about by touching the correspondingly desired sub function on the second display 3. It is also possible to interchange image contents of the second and third displays with one another, in which case it is necessary to ensure that the driver cannot be distracted while driving. In the stationary state of the motor vehicle it is also possible, for example, to represent entertainment information on the first display 2 since it is then not necessary to represent the speed of the motor vehicle and the driver can in fact be distracted in the stationary state. In the stationary state it is also possible to configure the image contents of the first display 2 such that the representation of the speed can be implemented differently than illustrated in FIG. 1. For example it is possible to display the speed in a digital fashion or to change the represented form of the speedometer. In any case it is necessary to ensure that while the motor vehicle is moving the driver can easily see the speed at which the vehicle is moving, in whatever form.

The section through the illustrated display and operator control system represented in FIG. 2 shows not only the common covering pane 1, the first display 2, the second display 3 and the third display 4 but also an adhesive 6, an anti-reflection layer 7, light sources 8, printed circuit boards 9, light shafts 10 and an eye E of an observer of the display and operator control system. The displays 2-4 are configured as liquid crystal displays illuminated by the light sources 8 in the form of light emitting diodes, which are arranged on the printed circuit boards 9. If, as here in illustrated exemplary embodiment, the distances between the individual displays are relatively large, it is preferred to provide separate printed circuit boards. If the individual displays are very close to one another it is, however, also perfectly appropriate to provide a common printed circuit board.

FIG. 3 shows not only the components already illustrated in FIG. 2 but also a warning light 5, which is adhered to the common covering pane 1 as a printed film by the adhesive 6. This warning light 5 can also be illuminated by a light source 8. The light shaft 10 has the effect that only the desired warning light lights up and the other adjacent warning lights do not light up. The light sources assigned to the warning lights 5 and the light sources 8 assigned to the display 2 are arranged on a common printed circuit board 9.

In the exemplary embodiment in FIG. 4, the first display 2, the second display 3 and the third display 4 take up virtually the entire surface of the common covering pane 1. This makes it possible to represent a particularly large amount of different information items in any desired form, wherein it is also necessary to ensure here that while the motor vehicle is moving the speed of the motor vehicle must definitely be displayed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display and operator control system for a motor vehicle, comprising:
    an instrument cluster configured to display operating parameters of the motor vehicle, the instrument cluster having a plurality of displays adhesively bonded under a common covering pane (1), the plurality of displays, each display being illuminated by one or more light sources 8), including:
        (i) a first display (2) configured to display the speed of the motor vehicle,
        (ii) a second display (3) embodied as a touchscreen for representing and activating operator control functions,
        (iii) a third display (4) configured to display entertainment information, and
        (iv) a warning light display (5), configured to display warnings and/or indications, the warning light display (5) being arranged separately from said first, second and third displays (2, 3, 4), wherein the one or more light sources (8) assigned to the warning light display (5) and the one or more light sources assigned to the first display (2) are arranged on a common printed circuit board (9); and
    an operator control system configured to control devices of the motor vehicle,
    wherein the entertainment information of the third display (4) is displayable on the first display (2) only in a case in which the motor vehicle is in a stationary state, and image content is interchangeable between the second and third displays.

2. The display and operator control system as claimed in claim 1, wherein the plurality of displays are bonded visually to the common covering pane (1).

3. The display and operator control system as claimed in claim 1, wherein the third display (4) is a touchscreen display.

4. The display and operator control system as claimed in claim 1, wherein the plurality of displays are configured such that miscellaneous information or entertainment contents can be represented on one or more of the first, second and third displays (2, 3, 4).

5. The display and operator control system as claimed in claim 1, wherein the plurality of displays are configured such that image contents of the first, second and third displays (2, 3, 4) can be reconfigured.

6. The display and operator control system as claimed in claim 5, wherein the plurality of displays are configured such that the position of the image contents can be changed by an operator pulling with one or more fingers, and the image contents can be shifted between the first, second and third displays (2, 3, 4).

7. The display and operator control system as claimed in claim 1, wherein the common covering pane (1) is colored.

8. The display and operator control system as claimed in claim 1, wherein the common covering pane (1) comprises an anti reflection layer (7).

9. The display and operator control system as claimed in claim 1, wherein one or more of the first, second and third displays include touchscreens providing haptic feedback.

10. The display and operator control system as claimed in claim 1, wherein an edge of the common covering pane (1) comprises a decorative element.

11. The display and operator control system as claimed in claim 10, wherein the edge of the common covering pane (1) comprises a light ring.

\* \* \* \* \*